Patented Mar. 15, 1938

2,111,006

UNITED STATES PATENT OFFICE 2,111,006

ABRASIVE PRODUCTS AND METHODS OF MANUFACTURING THE SAME

Norman P. Robie, Niagara Falls, N. Y., assignor to the Carborundum Company, Niagara Falls, N. Y., a corporation of Delaware No Drawing. Application December 10, 1936, Serial No. 115,191

15 Claims. (Cl. 51—280)

This invention relates to abrasive products and methods of manufacturing the same. More specifically, the invention is concerned with abrasive products such as polishing setup wheels, grinding wheels and abrasive paper and cloth in the preparation of which there is employed a binder comprising an aqueous solution or dispersion of a vinyl compound which is either soluble or self-dispersible in water.

This application is a continuation-in-part of my copending applications Serial No. 746,849, filed October 4, 1934; Serial No. 56,711, filed December 30, 1935 and Serial No. 92,016, filed July 22, 1936.

It has been proposed to make abrasive articles with glue and with phenol aldehyde condensation products. Articles made with glue are open to objection in that the glue is not heat resistant for severe grinding conditions where heat is generated. Glue is also unsatisfactory in that it putrefies, hydrolyzes and loses strength when stored in a liquid condition. Phenol aldehyde condensation products are open to objection in that the phenolic resins are inherently brittle, poorly adhesive and require heat to harden them sufficiently to permit handling. Furthermore, the use of these resins involves the employment of solvents which are expensive, frequently explosive and sometimes toxic. In order to develop strength in heat hardenable resins it is necessary to subject the resin to heat treatment. Since coated abrasives and polishing wheels are commonly made with cellulosic backing materials such as cloth and paper which are weakened when heated, this characteristic of phenolic resins presents a further disadvantage to their use in making coated abrasives. Many such resins also contain free phenol which reacts with certain fibers commonly used in cloth or paper and further weakens the backing material. Further, certain phenolic resins penetrate the fibers and on curing embrittle them, making them more susceptible to breaking.

I have discovered that certain polyvinyl compounds of the general nature of gums that are water-soluble or self-dispersible in water are excellent binders in cementing abrasive particles to each other and to backings.

In general, I have found that polymerized vinyl compounds, which contain sufficient hydroxyl (OH), carboxy (COOH) or neutralized carboxy groups (COOR, where R represents K, Na, $NH_4$, etc.) in the molecule, are either water-soluble or self-dispersible in water and that such materials are strongly adhesive, tough, and highly satisfactory binders for attaching abrasive grains to a backing or to each other in the production of abrasive articles. I have further found that these water-soluble or self-dispersible gums, by virtue of their hydroxy and carboxy groups, may be advantageously reacted with materials such as phenolic resins containing free aldehyde, aldehydes such as benzaldehyde, formaldehyde, tannic acid, chromic acid and other chromium compounds, $Cl_2$, $Br_2$ and sulphur or other hardening or insolubilizing agents in the preparation of certain classes of abrasive products. This reaction is preferably brought about after the abrasive products have been formed in order that the binder may be water-soluble while the articles are being formed.

These compounds may be prepared in a number of ways and may be one of several classes of polymerized vinyl compounds such as vinyl alcohol, esters, ethers and acetals.

Furthermore, materials having widely different properties may be made by varying the method of preparation. It is therefore possible by the use of my invention to provide binders having different properties but having the common advantage that they are all adapted to be liquefied by water, and hence are inexpensively applied to a backing.

One specific material or rather one group of materials which I have found to be very well adapted for use in making abrasive articles comprises the class wherein the hydroxyl group is attached directly to the vinyl group. The simplest form of such material is polyvinyl alcohol.

Referring further to this class of materials, the binder may comprise the polymerized alcohol alone or it may contain both an alcohol and other vinyl compounds such as a polyvinyl ester. Alternatively bodies comprising vinyl compounds which have been only partially hydrolyzed and are therefore what might be called "partial alcohols" may be employed.

A third class of materials which I have found suitable for use as binders for abrasive articles comprises the reaction product of polyvinyl alcohol with an acid or an aldehyde containing hydroxyl groups or the chemical equivalents thereof. Examples of such compounds are the vinyl ester of lactic or tartaric acid or the reaction product of polyvinyl alcohol with a hydroxy aldehyde.

Still other classes of water-dispersible or water-soluble polymerized vinyl compounds include certain vinyl ethers, such as vinyl methyl ether or ethers formed, for example, by the reaction of polyvinyl alcohol with alkylene oxides; partial vinyl esters of dibasic acids containing uncombined carboxyl (COOH) groups; partially chlorinated polyvinyl alcohol containing uncombined hydroxyl groups; and copolymers of polyvinyl alcohol with vinyl methyl ether.

Furthermore, for some purposes, these water-soluble or self-dispersible compounds may be advantageously modified by the incorporation of other binders which are water-soluble, such as glue, methyl cellulose, polyvinyl methyl ether, certain polymerized acrylic compounds, or sodium silicate, miscible with water in their initial state such as certain phenol-aldehyde and urea-aldehyde condensation products, or colloidally dispersed such as aqueous dispersions of rubber including rubber latex.

Glue is commonly used in manufacturing coated abrasives but has the disadvantage that it is brittle. Mixtures of glue and various water-soluble vinyl compounds have been found to be very valuable because the vinyl gums are naturally tough and thus compensate for and reduce the brittleness of glue. Mixtures of water-soluble polyvinyl compounds with phenol-aldehyde condensation products which may contain an excess of phenol or aldehyde, have also been found to be especially well adapted for use as a binder for coated abrasives for use in some kinds of abrading, as for example in metal surfacing. Alternatively, polyvinyl alcohol may be dissolved in phenol followed by subsequent reaction with an aldehyde.

Some of these water-soluble vinyl compounds, such as polyvinyl alcohol, may also be mixed with other liquid adhesives which are not soluble in water by employing the polyvinyl compound as a colloidal dispersing agent which stabilizes suspensions of water-insoluble resins in water and promotes the formation of colloidal aqueous dispersions or emulsions.

My new adhesives have the tremendous advantage in making coated abrasives over other binders which are not soluble in water in that they can be readily applied in the conventional abrasive paper making machine which is commonly designed to handle solutions of glue. Since such apparatus and methods are well known in the art, it appears to be unnecessary to describe them in detail. It is, therefore, to be understood that aqueous solutions or dispersions of my binder may be applied to the backing and subsequently coated with abrasive grains in any of the manners well known to the art. Methods which are commonly used are completely described in a publication of the Canadian Department of Mines No. 699 (Part IV, "Artificial Abrasives and Manufactured Abrasive Products and Their Uses").

In making coated abrasives I have sometimes found it advantageous to use my adhesive along with other adhesives. For example, in certain cases I prefer to adhere the grain layer to the backing, using hide glue and to apply my aqueous vinyl adhesive to the grain coating as a size coating. This sizing coating may be rolled or sprayed on according to the usual methods. In other cases I use my aqueous vinyl adhesive for adhering the grain coating to the backing and then apply a sizing coating of phenolic resin or other adhesive to the abrasive.

Some of the binders used in my invention form viscous solutions at comparatively low concentrations. Since the solid content of the liquid adhesive is an important factor in the manufacture of coated abrasives, it is desirable that this be as high as possible. I have found that the viscosity of solutions of my improved binders can be materially reduced by incorporating, with concentrated gels of the binder, certain peptizing agents. For example, many substituted hydrazines may be incorporated with a viscous gel and the mixture given an aging treatment at a somewhat elevated temperature. A specific treatment which I have used successfully consists of incorporating a few per cent of the zinc chloride double salt of phenyl hydrazine in finely divided form into an aqueous gel of polymerized vinyl alcohol, and heating the mixture in a closed container in the presence of a substantial proportion of air at 210° F. for about 24 hours.

I will now describe my invention by a number of specific examples. It is to be understood that these examples are for illustrative purposes only and are not limitative.

Example I

Polyvinyl alcohol was prepared by dissolving 2200 grams of polyvinyl acetate in 6600 grams of anhydrous methyl alcohol. Dry hydrogen chloride was conducted into the solution and bubbled through it for about three minutes. The solution was allowed to stand for 96 hours in a covered non-corrosive container at room temperature of about 70° F.

During this period the solution first jelled as a result of the formation of polyvinyl alcohol, which is insoluble in organic solvents. The gel then shrank exuding an anhydrous solution of methyl acetate in methyl alcohol which was drawn from the container.

The mass of gel continued to release liquid in reduced amounts as time went on, and at the end of an additional 96 hours about two-thirds of the original volume of solvent mixture had separated.

The mass of gel, which was at this stage somewhat of a cheesy consistency, was then cut up into pieces, dissolved in water, and heated to remove the remaining solvent mixture.

The aqueous solution of the gelled material was applied to a backing of paper of a type commonly used in the production of coated abrasives and known as 130 lb. cylinder paper, abrasive grains were distributed over the adhesive coated surface of the backing and the article was warmed to remove the water from the resin solution.

An additional or sizing coat of the adhesive was then applied in the conventional manner and the article was again heated to thoroughly dry the adhesive.

The abrasive product was formed into a belt and proved to be highly efficient in surfacing wood.

Example II

The product prepared as in Example I was admixed with a glue solution formed by swelling 1 part of hide glue in 2 parts of water and warming. The solution of the gel and the glue solution were mixed in proportions to give a solid content of 60 parts of gum to 40 parts of dry glue.

Example III

A water dispersible polyvinyl compound was prepared in the following manner:

2200 parts of polyvinyl acetate were dissolved in 4000 parts of acetone, 600 parts of water and 40 parts of concentrated hydrochloric acid were added and then the mixture was heated in a closed vessel at 200° F. for 8 hours, at the end of which time the vessel was uncovered and the mixture was boiled to distill off the acetone and the acid catalysts.

The syrupy liquid thus obtained, which was a partially hydrolyzed acetate, or partial alcohol, was used as an adhesive for coated abrasives in the manner described in detail in Example I.

Example IV

A partial alcohol was prepared as described in Example III except that polyvinyl acetate which had been previously reacted with a small percentage of acetaldehyde was substituted for the unmodified polyvinyl acetate of Example III.

Example V

Polyvinyl alcohol was prepared as described in Example I and was then esterified with lactic acid and taken up in water. The aqueous liquid was then applied to a backing material and an abrasive coated article was made as described in detail in Example I.

Example VI

Polyvinyl alcohol was prepared by dissolving 216 pounds of polyvinyl acetate in 465 pounds of anhydrous methanol, adding a catalyst made by dissolving 80 grams of metallic sodium in 8 liters of methanol, and allowing the mixture to stand until a gel of the polyvinyl alcohol had formed. The gum so prepared was then dissolved in water to form a 20% solution and this solution was mixed with a normally liquid phenol-formaldehyde condensation product in proportions such that the liquid adhesive contained equal parts of polyvinyl alcohol and phenolic condensation product. The mixture was a viscous homogeneous liquid which was stable and showed no tendency to separate.

Cloth drills after presizing were coated with the liquid adhesive and with fused alumina abrasive grains in a regular abrasive cloth making machine and after a preliminary drying to remove water from the adhesive coating, the articles were additionally coated with a second or "sizing" layer of the adhesive.

The thus-coated articles were dried at room temperature for two hours and were then heat treated for 15 hours at 250° F. The finished product was found to be especially efficient for use in abrading ferrous metals.

In place of the normally liquid phenol-formaldehyde condensation products I may use other resins in liquid form such as ammonia solutions of alkyd resins, aqueous solutions of the initial condensation product of urea and formaldehyde, solutions of solid phenolic resins, drying oil-modified resins, and liquid alkyd resins.

Example VII

Sections comprising many pieces of muslin stitched together were sized on the sides with polyvinyl alcohol solution. After the sections had dried they were glued together with polyvinyl alcohol and clamped to form a wheel 16″ in diameter by 2½″ face. The face of the wheel was trued on a lathe and was sized with polyvinyl alcohol.

The face of the wheel was then brushed with a 10% polyvinyl alcohol solution and was rolled in warm 60 grit fused alumina polishing grain. This coating was dried slightly and a second coating of polyvinyl alcohol adhesive and abrasive applied.

The wheel was then dried in a dry atmosphere at 100° F. and finally at 212° F. The wheel was mounted on a polishing stand and operated at a speed of 7000 surface feet per minute polishing steel.

The polyvinyl alcohol used for the adhesive was produced from a polyvinyl acetate having a relatively high molecular weight. It was very tough and fairly flexible.

Example VIII

A paste was made comprising fused alumina polishing grain and a solution of polyvinyl alcohol in water in the proportions of 90 parts grain to 10 parts solid polyvinyl alcohol. This paste was applied to the face of a sized polishing wheel prepared for coating as in Example VII. The coated wheel was dried, mounted and used as in the previous example.

Example IX

No. 16 mesh fused alumina was wet with a hot 20% solution of polyvinyl alcohol and dried. The dried mass was crushed and screened through 10 mesh. These coated granules were recoated with 20% polyvinyl alcohol solution and dried. The mass was crushed and screened through a 6 mesh screen. The screened coated grain was wet with a little 20% polyvinyl alcohol solution hot and the mixture cold pressed to shape. The pressed article was dried over night at 250° F. The total bond present in the bonded abrasive was 10.9%.

Example X

A plasticizing liquid was made as follows:
75 parts polyvinyl alcohol solution 28.6% solid in water
25 parts normally liquid heat reactive phenolic condensation product resin.

This plasticizing mixture was added to 14 grit fused alumina in the proportion of 90 parts to 850 parts of abrasive. 150 parts of powdered A-stage phenolic resin was added and uniformly mixed in to give free flowing resin coated granules. These granules were dried out free from moisture. After moistening with a little furfural they were cold pressed to form an abrasive article which was subsequently cured in an oven.

In an alternative procedure, the coated grains, prepared as described, were put into a mold and hot pressed at 350° F. and 2000 pounds per square inch pressure until the coatings had softened. The mold and its contents were then cooled and the formed article was removed from the mold and heated in an oven to cure the binder.

By using adhesives containing both a vinyl compound and a binder of another class, it is possible to produce articles which are particularly well suited for special kinds of abrading. The properties of the abrasive product may also be varied by using vinyl compounds which have been polymerized to different degrees whereby the molecules of the polymers contain different numbers of monomeric molecules. In general, I have found that the higher polymers are more satisfactory for most purposes, although the invention is not limited to the use of the more highly polymerized materials.

As indicated above, my invention has many advantages over the adhesives formerly used in the manufacture of abrasive articles. It provides a method for making abrasives with binders of different properties and therefore makes it possible to produce such articles which are particularly efficient for specific purposes. For example, coated abrasives which are to be used for woodworking require a binder having different properties than where the article is to be used for working steel. Furthermore, the characteristic of the binder can be varied depending upon the grit size of the abrasive grains which are to be used. Where coarse grits are employed, the binder must be stronger and tougher because the force applied to the binder through the abrasive grains is greater in such cases than where finer grits are used, by reason of the greater leverage on coarse grits.

In addition, my improved binders have the advantage over glue and normally liquid phenolic resins that aqueous solutions or dispersions of the binders are stable and adapted to be kept in liquid condition without deterioration. As is known, glue solutions putrefy upon standing and the strength and adhesiveness of the glue are impaired by subjection to temperatures substantially above 60° F. Consequently, where glue is employed as an adhesive, as in the manufacture of coated abrasive products, fresh batches of glue must be made up daily and precautions must be taken in the handling of the glue, both in its liquid state and after it has been applied to the backing to be sure that it is not overheated. Liquid phenolic resins also deteriorate with age even at normal temperatures, becoming much thicker in viscosity and unsuitable for use. At temperatures above normal this thickening and solidification becomes much more rapid. My binders may be heated to comparatively high temperatures without affecting the properties of the binder and are therefore more readily solidified and dried than is glue.

As has been pointed out, the binders are obtainable in various degrees of toughness and flexibility, depending upon the degree of polymerization of the product and are further adapted to be modified by the inclusion of suitable modifying agents.

Furthermore, my new adhesives have been found to be well adapted for use in the preparation of setup wheels because the adhesives can be liquefied and sold in liquid condition either alone or admixed with the abrasive grain, since there is no danger of putrefaction. Where glue is used, the user must prepare the glue solutions and in many instances is neither equipped nor trained to utilize glue to the best advantage.

As indicated, my invention is further adapted to a number of modifications such as the inclusion of other liquid adhesives which are miscible with the aqueous polyvinyl adhesives, or inert filling materials such as powdered flint, and in general to the modifications commonly used in the art, such as the incorporation of plasticizing or flexibilizing agents or other modifiers. The liquefied binders may be incorporated with the abrasive grains by the methods described in the specific examples or by other suitable methods. For example, certain of the liquefied binders have been found to be especially adapted for spraying and have been applied as sizing coats for coated abrasives by this method.

Other modifications of the invention may be employed and the invention may be embodied in other methods and forms than those specifically described, such as abrasive discs, where the binder may be employed to attach the abrasive grains to a backing (which may include vulcanized fiber) or to attach a preformed article to a backing such as steel, a hardened plastic material, wood or the like. It is therefore to be understood that the scope of the invention is not to be determined by the specific illustrations herein given but by the appended claims.

I claim:

1. An abrasive article comprising abrasive grains and a solidified binder comprising a polymerized vinyl compound containing sufficient hydroxyl groups to be self-dispersible in water.

2. An abrasive article comprising abrasive grains and a solidified binder comprising the reaction product of a hardening agent with a polymerized vinyl compound containing sufficient hydroxyl groups to be self-dispersible in water.

3. A bonded abrasive article comprising abrasive grains bonded into a unitary article with a binder comprising a polymerized vinyl compound containing sufficient hydroxyl groups to be self-dispersible in water.

4. A coated abrasive article comprising a backing material and a layer of abrasive grains attached thereto by a binder comprising a polymerized vinyl compound containing sufficient hydroxyl groups to be self-dispersible in water.

5. A coated abrasive article comprising a backing material and a layer of abrasive grains attached thereto by a binder comprising polyvinyl alcohol.

6. A coated abrasive article comprising a backing material and a layer of abrasive grains attached thereto by a binder comprising a partially hydrolized polyvinyl compound.

7. A coated abrasive article comprising a backing material and a layer of abrasive grains attached thereto by a binder comprising a polymerized vinyl ester of a hydroxy acid.

8. A coated abrasive article comprising a backing material and a layer of abrasive grains attached thereto by a binder comprising a polyvinyl compound containing sufficient hydroxyl groups to be self-dispersible in water, and a water soluble adhesive substantially free from the vinyl group.

9. A coated abrasive article comprising a backing material and a layer of abrasive grains attached thereto by a binder comprising glue and a polymerized vinyl compound containing sufficient hydroxyl groups to be self-dispersible in water.

10. A flexible abrasive article comprising a flexible base, abrasive grains, and a bond for securing said abrasive grains to said base, said bond comprising polyvinyl alcohol and a plasticizer therefor.

11. A flexible abrasive article comprising a flexible base, abrasive grains and a bond for securing said abrasive grains to said base, said bond comprising polyvinyl alcohol and a polyhydroxy compound as a plasticizer therefor.

12. An abrasive article comprising abrasive grains and a solidified binder comprising the reaction product of an aldehyde with a polymerized vinyl compound containing sufficient hydroxyl groups to be self-dispersible in water.

13. An abrasive article comprising abrasive grains and a solidified binder comprising the reaction product of a chromium compound with a polymerized vinyl compound containing sufficient hydroxyl groups to be self-dispersible in water.

14. An abrasive article comprising abrasive grains and a solidified binder comprising a heat-hardened reaction product of a heat-hardenable condensation product and a polymerized vinyl compound containing sufficient hydroxyl groups to be self-dispersible in water.

15. An abrasive article comprising abrasive grains and a solidified binder comprising the heat-hardened product of a heat-hardenable phenolic condensation product and a vinyl compound containing sufficient hydroxyl groups to be self-dispersible in water.

NORMAN P. ROBIE.